Figure 1:
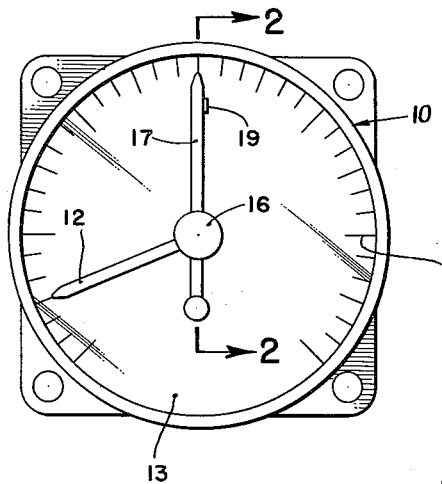

Aug. 8, 1961  R. P. GRANADA  2,995,106
MAXIMUM OR MINIMUM GAUGE POINTER INDICATOR
Filed April 29, 1960  2 Sheets-Sheet 1

*INVENTOR.*
RICHARD P. GRANADA
BY
*Hazard & Miller*
ATTORNEYS.

Aug. 8, 1961 R. P. GRANADA 2,995,106
MAXIMUM OR MINIMUM GAUGE POINTER INDICATOR
Filed April 29, 1960 2 Sheets-Sheet 2

*INVENTOR.*
RICHARD P. GRANADA
BY
*Hazard & Miller*
ATTORNEYS.

United States Patent Office 2,995,106
Patented Aug. 8, 1961

2,995,106
MAXIMUM OR MINIMUM GAUGE POINTER INDICATOR
Richard P. Granada, Monterey Park, Calif., assignor to Barton Instrument Corporation, Monterey Park, Calif., a corporation of California
Filed Apr. 29, 1960, Ser. No. 25,752
7 Claims. (Cl. 116—129)

This invention relates to a maximum or minimum gauge pointer indicator.

Explanatory of the present invention there are many indicating gauges having dials over which indicating pointers or needles traverse that are rotatable about axes located centrally of the dials. In many instances, and for various purposes it is desirable to indicate and to record the maximum value or the minimum value indicated by the indicating pointer or needle with respect to the gauge. Frequently the forces which trigger or actuate the indicating pointers are extremely small and consequently any recording pointer or needle that is moved thereby to a maximum or a minimum position must be capable of being moved with a minimum amount of effort. At the same time the recording pointer which records either the maximum or the minimum position assumed by the indicating pointer must have a very small mass so that in the event that the indicating pointer fluctuates rapidly the recording pointer will not be carried beyond the maximum position of the indicating pointer or beyond the minimum position of the indicating pointer because of its own inertia.

The foregoing and other requirements therefore require that the recording pointer be susceptible of being readily moved with a minimum amount of effort but that it be incapable of being so easily moved that its own inertia will carry it beyond the maximum or minimum positions of the indicating pointer.

To provide a recording pointer for indicating dials which can be mass-produced, it will be appreciated that it would normally be very difficult to so adjust the recording pointer so that it could be turned by the indicating pointer with a very small amount of effort but at the same time the indicating pointer would not be carried beyond its recording position by its own inertia and would remain in its set position until there was an opportunity to observe the reading recorded thereby. The adjustment of any form of tension spring to meet these opposed requirements would require a great deal of calibration and considerable labor.

It is an object of the present invention to provide a recording pointer susceptible of being applied to ordinary indicating gauges or dials which is so constructed that it can be mass-produced and all pointers will be remarkably uniform in their characteristics of being capable of being moved with the small amount of force derivable from the indicating pointer which will not overrun due to the inertia of the recording pointer and which will be frictionally held in its set position until such time as it is desired to re-set the recording pointer. At that time the recording pointer can be easily and quickly re-set.

Another object of the invention is to provide a recording pointer which can be easily and quickly converted from a pointer which will record the maximum reading made by the indicating pointer to a recording pointer which will record the minimum position indicated by the indicating pointer, or vice versa.

Figure 2:
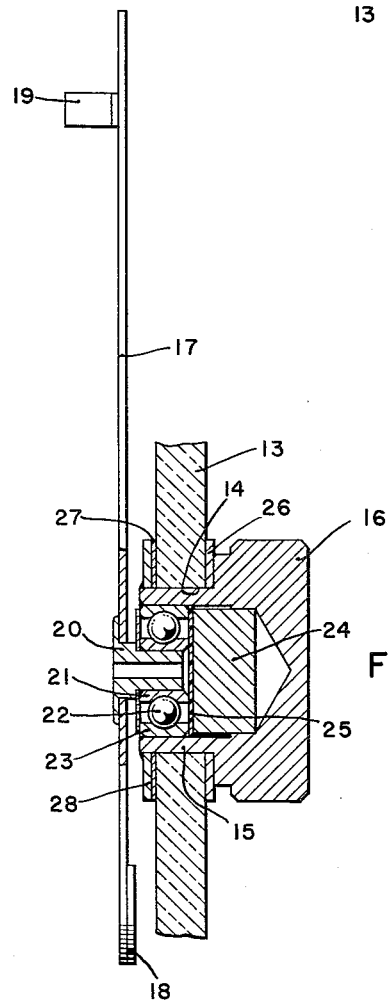
Figure 3:
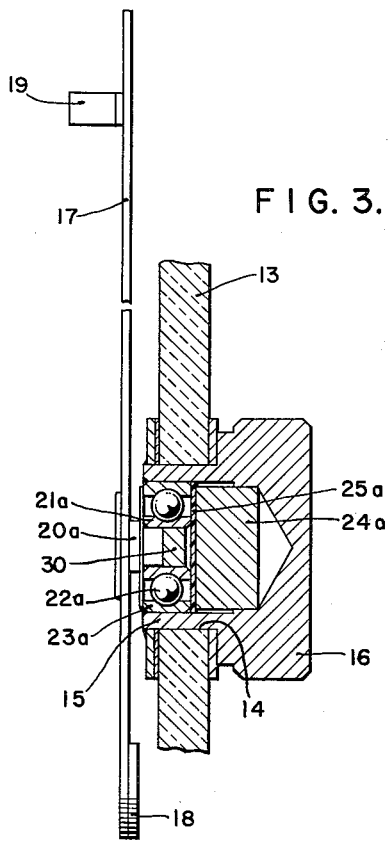
Figure 4:
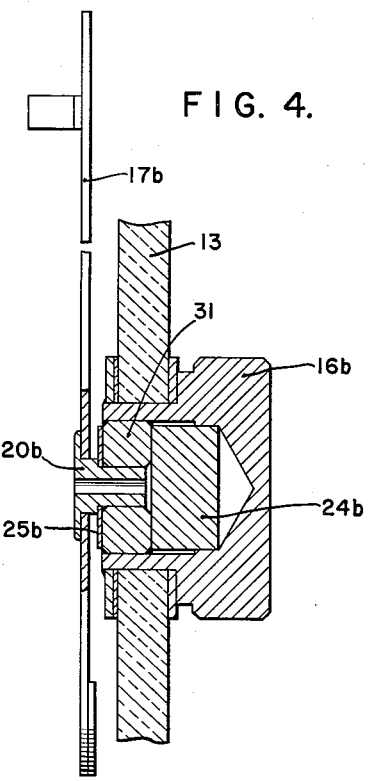
Figure 5:
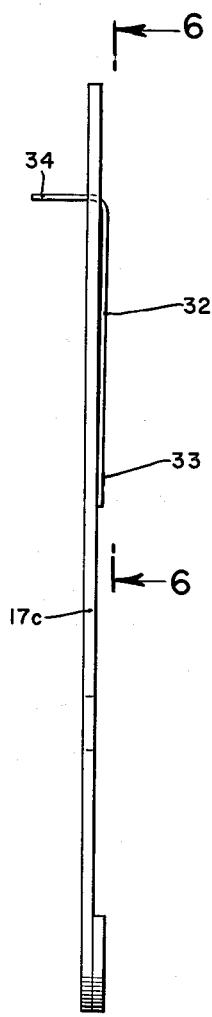
Figure 6:
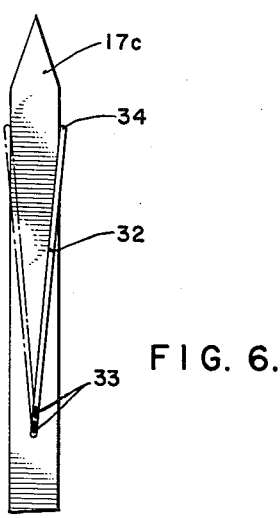

With the foregoing and other objects in view, which will be made manifest in the following detailed description and specifically pointed out in the appended claims, reference is had to the accompanying drawings for an illustrative embodiment of the invention, wherein:

FIGURE 1 is a front view in elevation of an indicating dial illustrating the construction including the recording pointer as having been applied thereto;
FIG. 2 is a vertical section on an enlarged scale taken upon the line 2—2 upon FIG. 1;
FIG. 3 is a view similar to FIG. 2, but illustrating an alternative form of construction;
FIG. 4 is a view similar to FIG. 2, but illustrating still another alternative form of construction;
FIG. 5 is a view in edge elevation of another form of recording pointer which may be employed in the present construction; and
FIG. 6 is a partial view taken substantially along the line 6—6 upon FIG. 5 in the direction indicated.

Referring to the accompanying drawings wherein similar reference characters indicate similar parts throughout, 10 indicates generally a gauge housing on which there is a circular graduated dial 11 that is adapted to be traversed by an indicating pointer 12 that is rotatable about an axis located centrally of the dial. Normally the dial 11 and indicating pointer 12 are enclosed by a transparent cover glass 13 for protection purposes.

The particular means for exciting or triggering movements of the indicating pointer 12 with relation to the dial 11 are immaterial insofar as the present invention is concerned. Thus, the indicating pointer 12 might be the indicating pointer of a simple pressure gauge, the indicating pointer of a temperature indicating instrument or some other measuring device, variations of which produce movements of the indicating pointer 12 with relation to the dial.

In many instances it is desirable to record in some manner the maximum position assumed by the indicating pointer 12 with relation to dial 11 during a given period, such as for example the maximum position assumed by the indicating pointer during one complete day. In other instances, it may be desirable to record the minimum position assumed by the indicating pointer 12 during a selected interval such as one complete day.

In accordance with the present invention the cover glass 13 which may be formed of transparent glass, is preferably formed of a transparent thermoplastic or thermosetting plastic material. Centrally thereof, and in alignment with the axis of rotation of the indicating pointer 12 there is an aperture 14 in which is rotatable the hollow hub 15 of a knob or handle 16 located on the obverse side of the cover glass. The recording pointer is indicated at 17 and is preferably counterweighted with a counterweight at 18 so that the arms of the recording pointer will counterbalance each other.

In the construction illustrated in FIGS. 1 and 2, the recording pointer has a finger 19 arranged along one edge thereof which extends rearwardly and is located in the path of swinging movement of the indicating pointer 12. The recording pointer is located on the rear side of the cover glass 13 and as the indicating pointer 12 moves from the position shown in FIG. 1 to a position past the position of the recording pointer 17, the finger 19 is engaged thereby and the recording pointer is carried with the indicating pointer to the maximum position assumed by the indicating pointer. If the indicating pointer 12 thereafter drops or recedes from its maximum position the recording pointer remains in the position that it has assumed to record and thus indicate the maximum position occupied by the indicating pointer 12.

If the recording pointer is to record the minimum position occupied by the indicating pointer 12, the finger 19 is located on the opposite edge of the recording pointer 17 from the position shown so that descending movements of the indicating pointer will engage the finger and move the recording pointer 17 to the minimum position assumed by the indicating pointer.

In accordance with the present invention, as depicted in FIGS. 1 and 2, the recording pointer 17 is mounted on a hollow bushing 20 which is pressed into or otherwise rigidly mounted in the inner race 21 of an antifriction bearing, the balls of which are indicated at 22 and which has an outer race 23 that is mounted in the hollow hub of the knob or handle 16. The bushing 20 may or may not be formed of a magnetizable material. Within the handle or knob 16 there is mounted a permanent magnet 24, and a plastic disc 25 of a material whose coefficient of friction is not only uniform but is quite low, is interposed between the inner race 21 of the antifriction bearing and the permanent magnet 24. Washers 26 and 27 are arranged on opposite sides of the cover glass 13 about the hub 15 and the hub is locked against axial movement within the bore 14 by means of a locking washer 28. Alternatively, part 28 may be a plain washer staked in place.

In this form of construction the inner race, if not the entire antifriction bearing, is assumed to be formed of a magnetizable material such as a magnetizable ferrous metal. The bushing 20 may likewise be formed of a magnetizable material though this is not necessary. The permanent magnet 24 constantly attracts the inner race 21 with the same or substantially the same force causing the side of this race to press against the plastic disc 25 with substantially the same force at all times. The permanent magnet 24 also constantly attracts the balls in the antifriction bearing with the same or substantially the same force, causing the balls to press against the grooves of the outer and inner races. The pressure of the balls against the grooves acts as a preload on the bearing. The friction due to this preload, produces a very small constant drag and consequently the balanced recording pointer 17 that is mounted on the inner race can be turned quite readily by the indicating pointer 12 even though the force transmitted by the indicating pointer 12 is of extremely low magnitude. As there is usually some clearance or "slop" in the antifriction bearings used for this purpose the inner race can move axially the small required distance to engage the disc 25 when it is attracted in that direction by the permanent magnet 24. When the indicating pointer 12 moves to its maximum position it picks up the recording pointer 17 and carries the recording pointer with it, and when the indicating pointer 12 recedes from the maximum position the recording pointer will remain in the maximum position to record and indicate the maximum reading of the indicating pointer 12. Whenever it is desired to adjust or re-set the recording pointer 17 this can be readily accomplished by merely rotating the handle or knob 16 which, because of the frictional engagement continuing between the inner race and the disc 25, will carry the recording pointer to its re-set position.

In the construction shown in FIG. 3, the construction is the same as that previously described with the exception that the antifriction bearing indicated at 21a, 22a, and 23a is assumed to have been made of a non-magnetizable material such as for example stainless steel, brass, or other material for the purpose of resisting corrosion. In this form of construction the bushing 20a is shortened and is partially replaced by a section 30 of a magnetizable material. The inner race 21a engages the disc 25a as before, and is urged in this direction by the mutual attraction between the magnetizable material 30 and the permanent magnet 24a. It will be readily appreciated that in this form of construction of the operation is substantially the same as that previously described, the difference being merely that instead of the magnet attracting the inner race of the bearing directly, it attracts the inner race 21a through the medium of attracting the magnetizable insert 30.

In the construction shown in FIG. 4, the construction is substantially the same as that previously described with the exception that the antifriction bearing has been replaced by a friction bearing or bushing 31 which may be formed of magnetizable material and which is pressed into knob 16b. The bushing 20b that mounts the recording pointer 17b floats in the bushing 31 which has a low friction plastic washer 25b interposed between the shoulder on bushing 20b and the face of bushing 31. Bushing 20b is formed of magnetizable material, and due to the constant attraction of the permanent magnet 24b bushing 20b will be axially attracted toward the magnet and press against the washer 25b with constant force.

In FIGS. 5 and 6 an alternative form of recording needle is disclosed where, instead of employing a rigid finger as at 19, the recording pointer 17c is equipped with a wire 32 anchored on the pointer at two closely adjacent points at 33 and having a rearwardly bent end 34. This rearwardly bent end 34 occupies the position of the finger 19 in the path of the indicating pointer when the wire is positioned in the full-line position shown in FIG. 6. To convert this pointer into a pointer which will indicate minimum readings of the indicating pointer it is merely necessary to spring the wire forwardly and move it laterally so as to position the rearwardly bent end 34 against the other side of the recording pointer or in the position illustrated in dotted lines on FIG. 6.

It will be appreciated from the above-described constructions that by the use of the magnet 24, 24a, or 24b that the recording pointer and its mounting structure are urged axially with a force which is constant or substantially so. The mounting structure for the recording pointer is consequently urged against a friction surface having a low coefficient of friction and which is constant or uniform in the sense that successive discs have substantially the same coefficient of friction. Also the effect of the magnetic force on the bearing balls in the earlier described instance illustrated in FIG. 2, contributes to the drag. The magnetic attraction of the balls also aids by minimizing the effect of severe pressure oscillations, which might otherwise cause overshoot of the recording pointer. Consequently, the improved construction can be mass-produced with the assurance that the recording pointer can be moved by the minute force exertable by the indicating pointer. Furthermore, as the mass of the recording pointer and of its supporting structure is not only balanced but is very small, danger of overthrowing the recording pointer by the sudden movements of the indicating pointer is reduced to a minimum. When it is desired to re-set the recording pointer, this can be readily accomplished by merely rotating the knob or handle 16, the friction being sufficient to cause the recording pointer to turn with the entrance of the knob or handle into the new or re-set position.

It will be appreciated that although in all forms above-described that the magnet is located in the handle and is turned therewith causing the friction disc 25 to also rotate with the handle that the positions of the permanent magnet and of the part or parts magnetically attracted thereby might be reversed. That is, the permanent magnet may be associated with the pointer and the magnetizable material could occupy the position of the magnet within the handle 16.

Various changes may be made in the details of construction without departing from the spirit and scope of the invention as defined by the appended claims.

I claim:

1. In combination with an indicator having an indicating pointer rotatably mounted for rotation about an axis, a recording pointer mounted for rotation about the same axis engageable by the indicating pointer so as to be movable thereby, a rotary handle for rotating the recording pointer, a permanent magnet in the handle, magnetizable means on the recording pointer adapted to be attracted thereby to urge the recording pointer axially, and a non-magnetizable disc of low coefficient of friction between the axially urged recording pointer and the permanent magnet.

2. In combination with an indicator having an indicating pointer rotatably mounted for rotation about an axis, a recording pointer mounted for rotation about the same axis engageable by the indicating pointer so as to be movable thereby, a rotary handle for rotating the recording pointer, a magnetizable antifriction bearing, means whereby the balls are magnetically urged in contact with the races to effect a preload, eliminating rotational lost motion or backlash and damping oscillations tending to cause overshoot of the recording pointer.

3. In combination with an indicator having an indicating pointer rotatably mounted for rotation about an axis, a recording pointer mounted for rotation about the same axis engageable by the indicating pointer so as to be movable thereby, a rotary handle for rotating the recording pointer, an anti-friction bearing interposed between the recording pointer and the handle, and a permanent magnet in the handle effective to attract the pointer in an axial direction to in effect preload the anti-friction bearing.

4. In combination with an indicator having an indicating pointer rotatably mounted for rotation about an axis, a recording pointer mounted for rotation about the same axis engageable by the indicating pointer so as to be movable thereby, a rotary handle for rotating the recording pointer, an anti-friction bearing interposed between the recording pointer and the handle, said anti-friction bearing having parts formed of magnetizable material, and a permanent magnet in the handle effective to attract the magnetizable parts of the bearing in an axial direction to in effect preload the bearing.

5. In combination with an indicator having an indicating pointer rotatably mounted for rotation about an axis, a recording pointer mounted for rotation about the same axis engageable by the indicating pointer so as to be movable thereby, a rotary handle for rotating the recording pointer, an anti-friction bearing interposed between the recording pointer and the handle, a permanent magnet in the handle effective to attract the pointer in an axial direction to in effect preload the anti-friction bearing, and a non-magnetizable disc of low friction coefficient interposed between the pointer and the magnet.

6. In combination with an indicator having an indicating pointer rotatably mounted for rotation about an axis, a recording pointer mounted for rotation about the same axis engageable by the indicating pointer so as to be movable thereby, a rotary handle for rotating the recording pointer, an anti-friction bearing interposed between the recording pointer and the handle, said anti-friction bearing having parts formed of magnetizable material, a permanent magnet in the handle effective to attract the magnetizable parts of the bearing in an axial direction to in effect preload the bearing, and a disc of low friction coefficient interposed between the magnetizable parts of the anti-friction bearing and the magnet.

7. In an indicator in which there is an indicating pointer rotatable about an axis and a recording pointer rotatable about the same axis, a resilient arm rigidly secured at one end to the recording pointer and having a rearwardly bent end arranged at the side of the recording pointer, the rearwardly bent end being arranged to be engaged by the indicating pointer, the resiliency of the arm enabling the rearwardly bent end to be positioned against the other side of the recording pointer whereby the same recording pointer may be converted from a maximum recording pointer to a minimum recording pointer, or vice versa.

References Cited in the file of this patent

UNITED STATES PATENTS

| 2,449,283 | Dike | Sept. 14, 1948 |
| 2,457,286 | Tollefsen | Dec. 28, 1948 |
| 2,475,573 | Smith | July 5, 1949 |

FOREIGN PATENTS

| 368,977 | Germany | Feb. 13, 1923 |